(12) United States Patent
Li et al.

(10) Patent No.: US 10,676,672 B2
(45) Date of Patent: Jun. 9, 2020

(54) LIQUID CRYSTAL ALIGNING AGENT, FILM, DEVICE HAVING THE SAME, AND METHOD FOR PRODUCING THE SAME

(71) Applicants: XIAMEN TIANMA MICRO-ELECTRONICS CO., LTD., Xiamen (CN); TIANMA MICRO-ELECTRONICS CO., LTD., Shenzhen (CN)

(72) Inventors: Jieliang Li, Xiamen (CN); Chikaaki Mizikuchi, Xiamen (CN)

(73) Assignees: XIAMEN TIANMA MICRO-ELECTRONICS CO., LTD., Xiamen (CN); TIANMA MICO-ELECTRONICS CO., LTD., Shenzhen (CN)

( * ) Notice: Subject to any disclaimer, the term of this patent is extended or adjusted under 35 U.S.C. 154(b) by 167 days.

(21) Appl. No.: 15/669,664

(22) Filed: Aug. 4, 2017

(65) Prior Publication Data
US 2017/0327745 A1   Nov. 16, 2017

(30) Foreign Application Priority Data

Nov. 24, 2016 (CN) .......................... 2016 1 1051854

(51) Int. Cl.
*C09K 19/56* (2006.01)
*C08G 73/10* (2006.01)
(Continued)

(52) U.S. Cl.
CPC .......... *C09K 19/56* (2013.01); *C08G 73/1075* (2013.01); *C08G 73/1078* (2013.01); *C08L 79/08* (2013.01); *C09D 179/08* (2013.01); *G02F 1/133723* (2013.01); *C08L 2205/025* (2013.01); *C08L 2205/035* (2013.01); *G02F 1/133788* (2013.01); *G02F 2001/133726* (2013.01);
(Continued)

(58) Field of Classification Search
CPC ................ C09K 19/56; C08G 73/1075; C08G 73/1078; C09D 179/08; C08L 79/08; C08L 2205/025; C08L 2205/035; G02F 1/133723; G02F 1/133788; G02F 2001/133726; Y10T 428/10; Y10T 428/1005; Y10T 428/1023
USPC ........ 428/1.1, 1.2, 1.25, 1.26; 349/123, 127, 349/128; 528/353, 170; 524/600, 606
See application file for complete search history.

(56) References Cited

U.S. PATENT DOCUMENTS

2015/0105503 A1* 4/2015 Ooki ...................... C08G 73/10
524/94

FOREIGN PATENT DOCUMENTS

CN    105567259 A    5/2016

* cited by examiner

*Primary Examiner* — Ruiyun Zhang
(74) *Attorney, Agent, or Firm* — Alston & Bird LLP (57) ABSTRACT

The present application relates to a liquid crystal aligning agent, a liquid crystal alignment film and a method for producing the same, as well as a liquid crystal display device. The liquid crystal aligning agent comprises (i) a first polyamic acid having a photoreactive group without a liquid crystal group; (ii) a second polyamic acid having a liquid crystal group without a photoreactive group; (iii) a third polyamic acid having both a liquid crystal group and a photoreactive group; (iv) a fourth polyamic acid having neither a photoreactive group nor a liquid crystal group. The liquid crystal display device using the liquid crystal alignment film formed by the liquid crystal aligning agent pro-
(Continued)

vided by the present disclosure has a high display contrast and an improved AC residual image.

3 Claims, 2 Drawing Sheets

(51) Int. Cl.
*C09D 179/08* (2006.01)
*C08L 79/08* (2006.01)
*G02F 1/1337* (2006.01)

(52) U.S. Cl.
CPC ........ *G02F 2202/025* (2013.01); *Y10T 428/10* (2015.01); *Y10T 428/1005* (2015.01); *Y10T 428/1023* (2015.01)

LIQUID CRYSTAL ALIGNING AGENT, FILM, DEVICE HAVING THE SAME, AND METHOD FOR PRODUCING THE SAME

CROSS-REFERENCE TO RELATED APPLICATIONS

The application claims the benefit of the earlier filing date of C.N. Patent Application No. CN201611051854.8, filed on Nov. 24, 2016, the contents of which are incorporated by reference herein in its entirety.

TECHNICAL FIELD

The present application relates to the field of liquid crystal display, especially relates to a liquid crystal aligning technique, a liquid crystal alignment film and a method for producing the same, as well as a liquid crystal display device.

BACKGROUND

Figure 1:
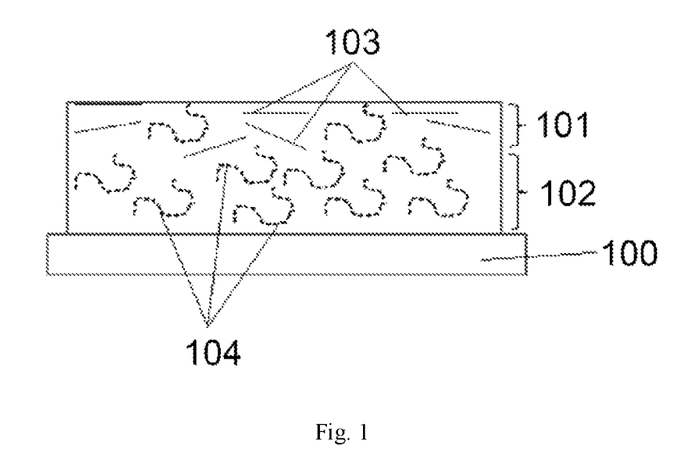
FIG. 1 shows the schematic structure of the light alignment film in the prior art.

Liquid crystal alignment films are composed of liquid crystal aligning agents. A liquid crystal aligning agent is a material containing polyamic acid molecules, first dispersed in a solvent, then coated onto a substrate to form a film after evaporation of the solvent. Typically the liquid crystal alignment film includes a two-layer structure as in FIG. 1, wherein the upper layer 101 is a light alignment layer, and the lower layer 102 is a conductive layer. Further, 100 is a substrate, 103 are liquid crystal cells, and 104 are polyamic acid having neither a photoreactive group nor a liquid crystal group (the schematic structure of the light alignment film in the related art is shown in FIG. 1)

In the light alignment layer 101, a liquid crystal component is added, which anneals the material for anisotropic effect occurring in photoreaction, improving overall alignment quality. The cumulated charges in the conductive layer 102 can be released on to the substrate side, so the conductive layer 102 is disposed in the lower layer of the alignment film to avoid direct contact with the liquid crystal component. But some conductive layer molecules do not only exist in the lower layer 102, may also migrate into the top layer. Therefore, during annealing the alignment ratio of the light alignment layer 101 is hindered and the alignment deteriorates, resulting in the occurrence of the AC residual image and the reduction of the contrast.

One solution in the related art is to adjust the molecular weights of materials in the upper and lower layers and their surface energy to promote the separation of the upper and lower layers. But this adjustment adds a greater restriction on the molecular designs of each layer, therefore limits the inherent functions of the materials. Moreover, the surface flatness is made worse, further affecting the alignment quality. There is a need to develop a liquid crystal aligning agent to solve the problems of high AC residual image and low contrast of the light alignment layer in the liquid crystal alignment film.

BRIEF SUMMARY OF THE DISCLOSURE

It is an objective of the present disclosure to provide a liquid crystal aligning agent comprising the following components:

(i) a polyamic acid having a photoreactive group without a liquid crystal group;

(ii) a polyamic acid having a liquid crystal group without a photoreactive group;

(iii) a polyamic acid having both a liquid crystal group and a photoreactive group; and (iv) a polyamic acid having neither a photoreactive group nor a liquid crystal group.

The second objective of the present disclosure is to provide a liquid crystal alignment film, composed of the liquid crystal alignment agent disclosed in the first objective.

The third objective of the present disclosure is to provide a method for producing the liquid crystal alignment film as stated in the second objective of the present disclosure, wherein the method comprises the following steps, (a) applying a liquid crystal aligning agent disclosed in the first objective on a substrate to form a coating film;

(b) pre-baking the substrate on which the coating film is formed; and (c) performing light alignment to the film obtained in step (b), followed by post-baking to form a liquid crystal alignment film.

The fourth objective of the present disclosure is to provide a liquid crystal display device which is coated with the liquid crystal alignment film formed from the liquid crystalline aligning agent as stated in the first objective of the present disclosure, or comprises the liquid crystal alignment film as stated in the second objective of the present disclosure, or comprises the liquid crystal alignment film prepared according to the method as stated in the third objective of the present disclosure.

As compared to the prior art, the present disclosure has the following benefits.

In the light alignment film provided by the disclosure, the liquid crystal structure will be attached to the upper layer. After the light reaction, the interaction of the liquid crystal part enhances the alignment thereof by heating. The light alignment part is subjected to linear polarization treatment to produce a gentle one-axis alignment trend. Meanwhile, the other part is the mesogen part. The phase transfer of liquid crystal occurs in the mesogen part during the heating treatment for cyclization. Due to the intermolecular interactions of the liquid crystalline, a very strong one-axis alignment force is produced, thereby enhancing the one-axis alignment of the light alignment part above. The liquid crystal structure is also added to the conductive layer of the lower layer, and the conductive layer also has a contribution to the alignment.

The PI molecules in the lower conductive layer of the present disclosure are also introduced into the liquid crystal structure. While the alignment is enhanced by heating the upper light alignment layer, the lower layer is also aligned, so as to improve the alignment property thereof. The present disclosure makes the molecular design of alleviating the separation of the upper and lower level feasible, and easily enhances the performance of each layer, and even improves the surface flatness. The present disclosure not only achieves a high alignment, but also enhances the anisotropy and anchoring force by introducing a liquid crystal structure in the conductive layer, which is different from the light alignment film composed of the conductive layer without any liquid crystal structure in the prior art.

The liquid crystal display device using the liquid crystal alignment film formed by the liquid crystal aligning agent provided by the present disclosure has a high contrast and improves the AC residual image.

DETAIL DESCRIPTION

In order to better understand the present disclosure, the present disclosure lists the following examples. Those skilled in the art shall know that the embodiments are merely illustrative of the disclosure and shall not be construed as limiting the present disclosure.

In one specific embodiment, the present disclosure provides a liquid crystal aligning agent comprising the following components,
(i) a polyamic acid having a photoreactive group without a liquid crystal group;
(ii) a polyamic acid having a liquid crystal group without a photoreactive group;
(iii) a polyamic acid having both a liquid crystal group and a photoreactive group; and
(iv) a polyamic acid having neither a photoreactive group nor a liquid crystal group.

The polyamic acid of the present disclosure has the structure of Formula (J-1) and can be obtained by reacting tetracarboxylic dianhydride with diamine:

(J-1)

Said "polymerizable prepolymer capable of reacting with a polyamic acid to form a PI film" is exemplarily selected from the group consisting of polymers, such as polyamic acid, polyimide, polyamide ester as shown in Formula (J-1), or a combination of at least two selected therefrom.

Said "polymerizable monomer capable of reacting with a polyamic acid to form a PI film" can exemplarily be selected from the group consisting of tetracarboxylic dianhydride and diamine, wherein said tetracarboxylic dianhydride has the structure of Formula (J-2); said diamine has the structure of Formula (J-3)

Formula (J-2)

Formula (J-3)

In the structures of formulas (J-1), (J-2) and (J-3), the structural units of A and B may be selected according to the design of the PI film. For example, the photoreactive group in (i) polyamic acid having a photoreactive group without a liquid crystal group may be at the position of A or B. As for (ii) polyamic acid having a liquid crystal group without a photoreactive group of the present application, the liquid crystal group therein may be at the position of A or B. As for (iii) polyamic acid having both a liquid crystal group and a photoreactive group, the liquid crystal group and photoreactive group therein may be independently at the position of A or B.

As for the component (iv) polyamic acid having neither photoreactive group nor liquid crystal group, the present application makes no specific definition to the selection of the structural units of A or B, and they may be any known groups in the art.

The typical but non-limitative example of the component (iv) may be polyamic acid obtained by reacting tetracarboxylic dianhydride with diamine.

The typical but non-limitative examples of tetracarboxylic dianhydride are selected from the group consisting of aliphatic tetracarboxylic dianhydrides, alicyclic tetracarboxylic dianhydrides, aromatic tetracarboxylic dianhydrides and the like. The exemplary aliphatic tetracarboxylic dianhydrides may include 1,2,3,4-butanetetracarboxylic dianhydride and the like. The exemplary alicyclic tetracarboxylic dianhydrides are selected from the group consisting of 1,2,3,4-cyclobutanetetracarboxylic dianhydride, 2,3,5-tricarboxylcyclopentyl acetic acid dianhydride, 1,3,3a,4,5,9b-hexahydro-5-(tetrahydro-2,5-dioxo-3-furyl)-naphtho [1,2-c] furan-1,3-dione, 1,3,3a,4,5,9b-hexahydro-8-methyl-5-(tetrahydro-2,5-dioxo-3-furyl) naphtho-[1,2-c]furan-1,3-dione, 3-oxabicyclo[3.2.1]octane-2,4-dione-6-spiro-3'-(tetrahydrofuran-2',5'-dione), 5-(2,5-dioxotetrahydro-3-furan)-3-methyl-3-cyclohexene-1,2-dicarboxylic anhydride, 3,5,6-tricarboxy-2-carboxy-methyl norbomane-2:3, 5:6-dianhydride, 4,9-dioxatricyclo [5.3.1.0$^{2,6}$]undecane-3,5,8,10-tetraone, and cyclohexane tetracarboxylic dianhydride. The exemplary aromatic tetracarboxylic dianhydride may include pyromellitic dianhydride and the like.

The typical but non-limitative examples of diamines are selected from the group comprising aliphatic diamines, alicyclic diamines, aromatic diamines or diamino organosiloxanes and the like.

The typical but non-limitative examples of aliphatic diamines are selected from the group consisting of ethylenediamine, 1,3-propanediamine, butanediamine, 2,5-dimethylhexamethylene diamine, m-xylylenediamine, tetramethylene diamine, pentamethylene diamine, hexamethylene diamine diamine and the like. The typical but non-limitative examples of alicyclic diamines are selected from the group consisting of 1,2-cyclobutanediamine ( ),

1,3-cyclopentylenediamine

( ), 1,3-bis(aminomethyl) cyclohexane and the like.

The typical but non-limitative examples of aromatic diamines include the compound having the structure of Formula (J-4)

Formula (J-4)

wherein $X_1$ and $X_2$ are each independently selected from the group consisting of fluorine atom, iodine atom, chlorine atom, hydroxyl group, C1-C10 hydroxyalkyl group, carboxyl group, ester group, C1-C10 substituted or unsubstituted alkyl group, C2-C12 substituted or unsubstituted alkenyl group, C3-C13 substituted or unsubstituted alkynyl group and C6-C20 aromatic groups, optionally methyl, ethyl, alkoxy, monofluoro-substituted methyl, monofluoro-substituted ethyl, benzyl, phenethyl, alkoxy-substituted benzoate group wherein $R_{30}$, $R_{31}$ and $R_{32}$ are selected from the group consisting of alkyl groups containing at least one carbon atom, which may be C1-C20 alkyl group, or alkyl groups having more carbon atoms) and acrylate methylene group The typical but non-limitative examples of aromatic diamines are selected from the group consisting of p-phenylenediamine, 4,4'-diaminodiphenyl sulfide, 1,5-diaminonaphthalene, 2,2'-dimethyl-4,4'-diaminobiphenyl, 2,2'-bis(trifluoro-methyl)-4,4'-diaminobiphenyl, 2,7-diaminofluorene, 4,4'-diaminodiphenyl ether, 1,5-diaminonaphthalene, 2,2'-dimethyl-4,4'-diaminobiphenyl, 2,2'-bis(trifluoro-methyl)-4,4'-diaminobiphenyl, 2,7-diaminofluorene, 4,4'-diminodiphenyl ether, 2,2-bis[4-(4-aminophenoxy)phenyl] propane, 9,9-bis(4-aminophenyl)fluorene, 2,2-bis[4-(4-aminophenoxy)phenyl] hexafluoropropane, 2,2-bis(4-aminophenyl)-hexafluoropropane, 4,4'-(p-phenylene diisopropylidene), 4,4'-(m-phenylene-diisopropylidene)diphenylamine, 1,4-bis(4-aminophenoxy)benzene, 4,4'-bis(4-amino-phenoxy)biphenyl, 2,6-diaminopyridine, 3,4-diaminopyridine, 2,4-diaminopyrimidine, 3,6-diaminoacridine, 3,6-diaminocarbazole, N-methyl-3,6-diaminocarbazole, N-ethyl-3,6-diaminocarbazole, N-phenyl-3,6-diaminocarbazole, N,N'-bis(4-aminophenyl)-benzidine N,N'-bis(4-aminophenyl)-N,N'-dimethylbenzidine, 1,4-bis-(4-aminophenyl)piperazine, 1-(4-aminophenyl)-2,3-dihydro-1,3,3-trimethyl-1H-inden-5-amine, 1-(4-aminophenyl)-2,3-dihydro-1,3,3-trimethyl-1H-inden-6-amine, 4-(4'-trifluoromethoxybenzoyloxy)cyclohexyl-3,5-diaminobenzoate, 4-(4'-trifluoromethylbenzoyloxy)cyclohexyl-3,5-diaminobenzoate, 1,1-bis (4-((aminophenyl)methyl)phenyl)-4-butylcyclohexane, 1,1-bis(4-((aminophenyl)methyl)phenyl)-4-heptyl-cyclohexane, 1,1-bis (4-((aminophenyl)methyl)phenyl)-4-heptyl-cyclohexane, 1,1-bis (4-((aminophenyl)methyl)phenyl)-4-(4-heptylcyclohexyl)-cyclohexane, 4-aminobenzylamine, 3-aminobenzylamine and the like.

The exemplary diamino organosiloxanes include 1,3-bis (3-aminopropyl)tetra-methyldisiloxane and the like.

In the components of the liquid crystal aligning agent of the present disclosure, the photoreactive groups (exemplarily may include isomeric photoreaction groups, bridging type photoreactive groups, fries transferable photoreaction groups and decomposable photoreactive groups) may be linked in a branched form at the position A or the position B of the molecular chain of the polyamic acid (J-1). The exemplary connection mode is shown in Formula (J-5) (In Formula (J-5), the photoreactive group linked in the branched form is represented by $FG_1$), or is linked to the position A or the position B of the polyamic acid (J-1) molecular chain in the form of a block. The exemplary connection mode is shown in Formula (J-6) (In Formula (J-6), the photoreactive group linked in the block form is represented by $FG_2$)

Formula (J-5)

Formula (J-6)

wherein $FG_1$ represents a decomposable photoreactive group linked in a branched form; $FG_2$ represents a decomposable photoreactive group linked in a block form; $X_3$ represents any group selected from the group consisting of, e.g. hydrogen atom, fluorine atom, iodine atom, chlorine atom, hydroxyl group, C1 to C10 hydroxyalkyl groups, carboxyl groups, ester groups, C1 to C10 substituted or unsubstituted alkyl groups, C2 to C12 substituted or unsubstituted alkenyl groups, C3 to C13 substituted or unsubstituted alkynyl groups, C6 to C20 aromatic groups, optionally methyl, ethyl, alkoxy, monofluoro-substituted methyl, monofluoro-substituted ethyl, benzyl, phenethyl, alkoxy-substituted benzoate wherein $R_{30}$, $R_{31}$ and $R_{32}$ are selected from the group consisting of alkyl groups containing at least one carbon atom, e.g. C1-C20 alkyl groups, or alkyl groups having more carbon atoms), acrylate methylene optionally methyl; f is an integer which is greater than 1, e.g. 2, 3, 4, 5, 6, 11, 15, 23 and the like; $X_4$ and $X_5$ represent empty bonds, or any group having two bonds, e.g. oxygen atom, sulfur atom, C1-C10 substituted or unsubstituted alkylene group, C2-C12 substituted or unsubstituted alkenylene group, C3-C13 substituted or unsubstituted alkynylene group, C6-C20 arylene, optionally methylene, ethylene, alkyleneoxy, monofluoro-substituted methylene, monofluoro-substituted ethylene, benzylidene, phenylethylene and the like.

The photoreactive groups are selected from the group consisting of isomeric photoreaction groups, bridging photoreaction groups, fries transferable photoreaction groups and decomposable photoreactive groups.

The exemplary isomeric photoreaction groups include the molecules containing azo bonds, and the isomeric photoreaction groups linked in the branched form optionally are selected from any or a combination of at least two of the isomeric photoreaction groups linked in the block form optionally are selected from any or a combination of at least two of wherein $R_1$, $R_2$, $R_3$, $R_4$, $R_5$, $R_6$, $R_7$, $R_8$, $R_9$, $R_{11}$, $R_{12}$, $R_{13}$, $R_{14}$, $R_{15}$, $R_{16}$, $R_{17}$, $R_{18}$ and $R_{19}$ are each independently selected from hydrogen atom, fluorine atom, iodine atom, chlorine atom, hydroxyl group, C1-C10 hydroxyalkyl group, carboxyl group, ester group, C1-C10 substituted or unsubstituted alkyl group, C2-C12 substituted or unsubstituted alkenyl group, C3-C13 substituted or unsubstituted alkynyl group and C6-C20 aromatic groups.

The isomeric photoreaction groups linked in the block form are optionally

The decomposable photoreactive groups linked in the branched form include any or a combination of at least two of and

;

the decomposable photoreactive groups linked in the block form include any or a combination of at least two of -continued and

, wherein $R_{20}$ is selected from the group consisting of hydrogen atom, C1-C10 hydroxyalkyl group, carboxyl group, ester group, C1-C10 substituted or unsubstituted alkyl group, C2-C12 substituted or unsubstituted alkenyl group, C3-C13 substituted or unsubstituted alkynyl group and C6-C20 aromatic groups.

The exemplary bridging photoreaction groups may have the structure of wherein the bridging photoreaction groups are linked to the position A or B of the molecular chain of polyamic acid (J-1) via $R_1'$ and $R_2'$, wherein $R_1'$, $R_2'$, $R_3'$ and $R_4'$ are each independently selected from hydrogen atom, fluorine atom, iodine atom, chlorine atom, hydroxyl group, C1-C10 hydroxyalkyl group, carboxyl group, ester group, C1-C10 substituted or unsubstituted alkyl group, C2-C12 substituted or unsubstituted alkenyl group, C3-C13 substituted or unsubstituted alkynyl group, C6-C20 aromatic groups and C6-C20 arylene groups.

The exemplary fries transferable photoreaction groups may have the structure of wherein $R_5'$ and $R_6'$ are each independently selected from hydrogen atom, fluorine atom, iodine atom, chlorine atom, hydroxyl group, C1-C10 hydroxyalkyl group, carboxyl group, ester group, C1-C10 substituted or unsubstituted alkyl group, C2-C12 substituted or unsubstituted alkenyl group, C3-C13 substituted or unsubstituted alkynyl group, C6-C20 aromatic groups and C6-C20 arylene groups.

In the components of the liquid crystal aligning agent of the present disclosure, the mesogen group may be linked in the form of a block at the position A or B of the molecular chain of the polyamic acid (J-1) (J-7), and the exemplary linking mode is shown in Formula (J-7) (wherein, for convenience, GG is used to represent the mesogen group linked in the block form for convenience of illustration).

Formula (J-7)

In Formula (J-7), $X_6$ and $X_7$ represent empty bonds, or any group having two bonds, e.g. oxygen atom, sulfur atom, C1-C10 substituted or unsubstituted alkylene group, C2-C12 substituted or unsubstituted alkenylene group, C3-C13 substituted or unsubstituted alkynylene group, C6-C20 aromatic groups and C6-C20 arylene groups, optionally methylene, ethylene, alkyleneoxy, monofluoro-substituted methylene, monofluoro-substituted ethylene, benzylidene, phenylethylene and the like.

In the present disclosure, the liquid crystal group means that the inside of the main chain cannot be internally rotated, or, although the internal rotation does not change the direction of the chain, mainly referring to a cyclic structures such as benzene ring.

In the aforesaid embodiment, the liquid crystal group optionally comprises any one or a combination of at least two of the following structures: polybenzothienyl, poly-3,4-ethylenedioxythienyl, polypyrrolyl, biphenyl group, wherein $R_{21}$, $R_{22}$, $R_{23}$, $R_{24}$, $R_{25}$, $R_{26}$, $R_{27}$ and $R_{28}$ are each independently selected from the group consisting of hydrogen atom, C1-C3 substituted or unsubstituted alkoxy group, amino group and dialkylamino group, optionally biphenyl, terphenyl and the like.

The examples of the liquid crystal groups described above do not show any connectors except for Structures A and B in the polyamic acid shown in Formula (J-1), and those skilled in the art can link these groups according to their professional knowledge. The present disclosure illustratively provides the following examples, which are not to be taken as a specific limitation of the present disclosure.

For the liquid crystal group capable of being used as Structure A, their linking modes thereof are shown as follows

For the liquid crystal group capable of being used as Structure B, their linking modes thereof are shown as follows

-continued or

In one preferred embodiment, said (i) polyamic acid having a photoreactive group and no liquid crystal group has the structure of Formula (I)

Formula (I)

wherein $R_1$ and $R_2$ each independently are selected from the group consisting of photoreactive groups and alkyl groups, or a combination of at least two selected therefrom; at least one of R1 and R2 is a photoreactive group;

the alkyl groups are selected from the group consisting of substituted or unsubstituted linear or branched alkylene groups of C1-C10, substituted or unsubstituted linear or branched alkenylene groups of C2-C10 and substituted or unsubstituted linear or branched alkynylene of C2-C10, or a combination of at least two selected therefrom;

the photoreactive groups are selected from the group consisting of isomeric photoreaction groups, bridging photoreaction groups, fries transferable photoreaction groups and decomposable photoreactive groups.

In one exemplary embodiment, the isomeric photoreaction group comprises any one of or a combination of at least two selected from the following structure, wherein $R_{11}$, $R_{12}$, $R_{13}$, $R_{14}$, $R_{15}$, $R_{16}$, $R_{17}$, $R_{18}$, $R_{19}$, $R_{20}$, $R_{21}$, $R_{22}$, $R_{23}$, $R_{24}$ and $R_{25}$ are each independently selected from the group consisting of hydrogen atom, fluorine atom, iodine atom, chlorine atom, hydroxyl group, C1-C10 hydroxyalkyl group, carboxyl group, ester group, C1-C10 substituted or unsubstituted alkyl group, C2-C12 substituted or unsubstituted alkenyl group, C3-C13 substituted or unsubstituted alkynyl group and C6-C20 aromatic groups;

$n_1$ is an integer of $\geq 1$.

The exemplary isomeric photoreactive group is attached to the backbone of the polyamic acid of Component (i) by the formula (J-6).

In one exemplary embodiment, said (ii) polyamic acid having a liquid crystal group without a photoreactive group has the structure of Formula (II)

Formula (II)

wherein $R_3$ and $R_4$ each independently are selected from the group consisting of liquid crystal groups and alkyl groups, or a combination of at least two selected therefrom;

the alkyl groups are selected from the group consisting of substituted or unsubstituted linear or branched alkylene groups of C1-C10, substituted or unsubstituted linear or branched alkenylene groups of C2-C10 and substituted or unsubstituted linear or branched alkynylene of C2-C10, or a combination of at least two selected therefrom;

the liquid crystal groups are selected from the group consisting of substituted or unsubstituted phenyl of C6-C20, substituted or unsubstituted biphenyl of C12-050, substituted or unsubstituted heterocyclic group of C2-C20, substituted or unsubstituted phenylpropyl of C9-050;

$n_2$ is an integer $\geq 1$.

In one exemplary embodiment, said (iii) polyamic acid having both a liquid crystal group and a photoreactive group has the structure of Formula (III)

Formula (III)

wherein $R_5$, $R_6$ and $R_7$ each independently are selected from the group consisting of alkyl groups, liquid crystal groups and photoreactive groups, or a combination of at least two selected therefrom; at least one of $R_5$, $R_6$ and $R_7$ is a liquid crystal group, and at least one of them is a photoreactive group;

the alkyl groups are selected from the group consisting of substituted or unsubstituted linear or branched alkylene groups of C1-C10, substituted or unsubstituted linear or branched alkenylene groups of C2-C10 and substituted or unsubstituted linear or branched alkynylene of C2-C10, or a combination of at least two selected therefrom;

the liquid crystal groups are selected from the group consisting of substituted or unsubstituted phenyl of C6-C20, substituted or unsubstituted biphenyl of C12-050, substituted or unsubstituted heterocyclic group of C2-C20, substituted or unsubstituted phenylpropyl of C9-050;

the photoreactive groups are selected from the group consisting of isomeric photoreaction groups, bridging photoreaction groups, fries transferable photoreaction groups and decomposable photoreactive groups.

In one exemplary embodiment, the isomeric photoreaction group comprises any one of or a combination of at least two selected from the following structure, wherein $R_{11}$, $R_{12}$, $R_{13}$, $R_{14}$, $R_{15}$, $R_{16}$, $R_{17}$, $R_{18}$, $R_{19}$, $R_{20}$, $R_{21}$, $R_{22}$, $R_{23}$, $R_{24}$ and $R_{25}$ are each independently selected from the group consisting of hydrogen atom, fluorine atom, iodine atom, chlorine atom, hydroxyl group, C1-C10 hydroxyalkyl group, carboxyl group, ester group, C1-C10 substituted or unsubstituted alkyl group, C2-C12 substituted or unsubstituted alkenyl group, C3-C13 substituted or unsubstituted alkynyl group and C6-C20 aromatic groups; $n_1$ is an integer $\geq 1$.

The exemplary isomeric photoreactive group is attached to the backbone of the polyamic acid of Component (iii) by the formula (J-6).

In one exemplary embodiment, said (iv) polyamic acid having neither a liquid crystal group nor a photoreactive group has the structure of Formula (IV)

Formula (IV)

wherein $R_8$ and $R_9$ each independently are selected from the group consisting of alkyl groups, or a combination of at least two selected therefrom;

the alkyl groups are selected from the group consisting of substituted or unsubstituted linear or branched alkylene groups of C1-C10, substituted or unsubstituted linear or branched alkenylene groups of C2-C10 and substituted or unsubstituted linear or branched alkynylene of C2-C10;

$n_4$ is an integer $\geq 1$.

In one optional embodiment of the present disclosure, the liquid crystal aligning agent comprises the following components.

(i) a polyamic structure unit having a photoreactive group without a liquid crystal group has the structure wherein $n_1$ is in a range of 5-20;

(ii) a polyimide structure unit having a liquid crystal group without a photoreactive group has the structure of wherein $n_2$ and $n_3$ are independently in a range of 5-20;

(iii) a polyimide structure unit having both a liquid crystal group and a photoreactive group has the structure of wherein $n_4$ is independently in a range of 5-20;

(iv) a polyimide structure unit having neither a photoreactive group nor a liquid crystal group has the structure of wherein $n_5$ is independently in a range of 5-20.

In the liquid crystal aligning agent of the present disclosure, the content of each component may be, for example, the sum of the contents of the component (i) and (iii) being 30 to 50% by weight, the sum of the contents of the component (ii) and (iv) being 50 to 70% by weight; the ratio of the addition ratio of the component (iii) may be 1:1, the ratio of the component (ii) to the component (iv) may be 1:1; the sum of the contents of the components (i), (ii), (iii) and (iv) is 100% by weight.

In order to facilitate the operation of the alignment process, the liquid crystal aligning agent of the present disclosure is further provided with a solvent which dissolves the components in the liquid crystal aligning agent. The present disclosure does not specifically limit the type of the solvent. The typical but non-limitative example is selected from γ-BL, NMP and BC, or a combination of at least two selected therefrom, optionally a mixed solvent of 50% γ-BL (γ-butyrolactone), 20% NMP (N-methyl-2-pyrrolidone) and 30% BC (butyl carbonate).

When the liquid crystal aligning agent is added with the solvent, the liquid crystal aligning agent has a solid content of 5.5 to 6.0 wt. %. Optionally the sum of the mass percentages of the components (i), (ii), (iii) and (iv) is 5.5 to 6.0 wt. %.

The synthesis of the polyamic acid (including the components (i), (ii), (iii) and (iv)) according to the present disclosure is the technical means which can be obtained by those skilled in the art. The typical but non-limitative synthesis method of polyamic acid comprises mixing tetracarboxylic dianhydride (having the same structure A as the target polyamic acid) with diamine (having the same structure B as the target polyamic acid) in an organic solvent in a mixing ratio that 0.2 to 2 equivalents of tetracarboxylic dianhydride is added into 1 equivalent of diamine, optionally 0.3 to 1.2 equivalents (acid anhydride equivalent), reacting for 0.1-24 h at 0-100° C.

The liquid crystal aligning agent according to the present disclosure may further include other functional components capable of improving the stability, electrical properties, and coating film properties of the liquid crystal aligning agent in different levels.

The present disclosure discloses adding into the PI material a component having a liquid crystal structure, making the polyamic acid dispersed in the upper light aligning layer and having a mesogen structure having one-axis aligning force through which the one-axis alignment of the aforesaid light aligning part can be enhanced. Meanwhile, a liquid crystal structure is also added to the lower conductive layer which also makes contribution to the alignment.

In one embodiment, the present disclosure further provides a liquid crystal alignment film prepared from the aforesaid liquid crystalline aligning agent.

Figure 2:
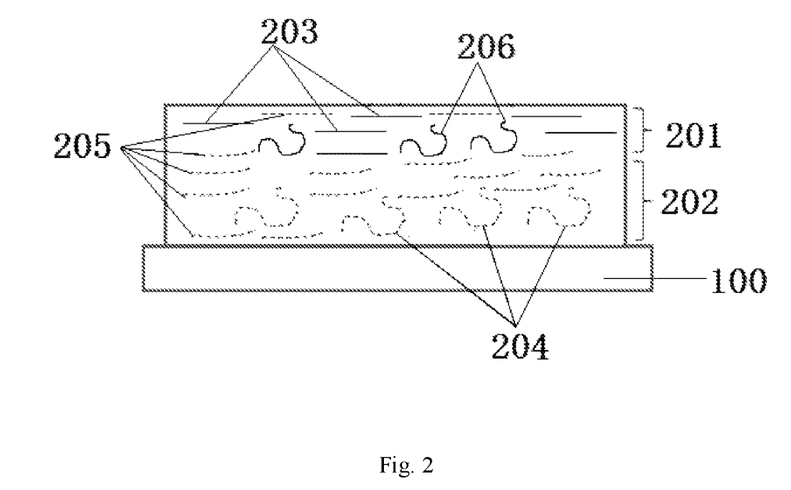
FIG. 2 shows the schematic structure of the light alignment film in the present disclosure.

In one preferred embodiment, the upper layer (201) of the liquid crystal alignment film comprises (i) polyamic acid 206 having a photoreactive group without a liquid crystal group, and (iii) polyamic acid 203 having both a liquid crystal group and a photoreactive group;

the lower layer (202) of the liquid crystal alignment film comprises (ii) polyamic acid 205 having a liquid crystal group without a photoreactive group; and (iv) polyamic acid 204 having neither a photoreactive group nor a liquid crystal group.

The light alignment film obtained by the present disclosure has the schematic structure as shown in FIG. 2. The polyamic acid represented by the solid line has the alignment, i.e. having a photoreactive group; the polyamic acid represented by the dotted line does not have a photoreaction group; the polyamic acid represented by a straight line has a liquid crystal structure; the polyamic acid represented by a curve does not have a liquid crystal structure.

In FIG. 2, the upper 201 and lower layers 202 of the liquid crystal alignment film are only different from each other. In the preparation of the liquid crystal alignment film, the components of the liquid crystal aligning agents are the spontaneous layers, so that the upper and lower layers cannot be strictly distinguishable by the components. That is to say that the upper polyamic acid is predominantly component (i) 206 and (iii) 203, and may also contain a minor amount of component (ii) 205 and (iv) 204, while the lower polyamic acid is predominantly component (ii) 205 and (iv) 204, and may also contain a minor amount of component (i) 206 and (iii) 203. In addition, it should be noted that the number of various lines shown in FIG. 2 is merely used to illustratively indicate the possible spatial position of each component, and does not represent any component ratio.

In one embodiment, the present disclosure further provides a method for producing the liquid crystal alignment film, characterized in comprising the following steps, (a) applying the above liquid crystal aligning agent on a substrate to form a coating film;

(b) pre-baking the substrate on which the coating film is formed; and

(c) performing light alignment to the film obtained in step (b), followed by post-baking to form a liquid crystal alignment film.

EXAMPLES

Example 1

A liquid crystal aligning agent, characterizing in comprising the following components, (i) a polyamic acid having a photoreactive group without a liquid crystal group, the polyamic acid has the structure wherein the average value of $n_1$ was 10.5, and the addition amount was 1 part by weight;

(ii) a polyamic acid having a liquid crystal group without a photoreactive group, the polyamic acid has the structure:

wherein the average value of $n_2$ was 5, and the addition amount was 1 part by weight;

(iii) a polyamic acid having both a liquid crystal group and a photoreactive group, the polyamic acid has the structure, wherein the average value of $n_4$ was 6.5, and the addition amount was 3 parts by weight;

(iv) a polyamic acid having neither a photoreactive group nor a liquid crystal group, the polyamic acid has the structure wherein the average value of $n_5$ was 12, and the addition amount was 1 part by weight;

(v) the solvent being a mixed solvent of γ-BL 50%, NMP 20% and BC 30%, and being added in an amount of 94 parts by weight;

A liquid crystal alignment film prepared from the liquid crystal aligning agent in Example 1, by the following steps (a) applying a liquid crystal aligning agent in Example 1 on a substrate to form a coating film having a certain viscosity and a better diffusion;

(b) pre-baking at 110° C. for 90 s the substrate on which the coating film is formed;

(c) irradiating the film obtained in step (b) with linearly polarized light of 254 to 365 nm, and the amount of the bulk being 3000 mJ, to carry out the reaction so as to form an alignment;

(d) post-baking the substrate processed in step (c) at 230° C. for 30 min to form a liquid crystal alignment film having a thickness of 100±10 nm.

Example 2

It was different from Example 1 only in that the component (ii) was wherein the average value of $n_3$ was 4.

Example 3

It was different from Example 1 only in that the component (ii) was added in an amount of 0.5 part by weight, while the component (iv) was added in an amount of 1.5 parts by weight.

Comparison Example 1

It was different from Example 1 only in comprising no component (ii). As for other components, the component (i) was added in an amount of 1 part by weight; the component (iii) was added in an amount of 3 parts by weight; the component (iv) was added in an amount of 2 parts by weight.
Performance Test Contrast test: using CS2000 or CA310 and other machines to measure the contrast of LCD screen, respectively measuring the brightness of the LCD screen displaying the white screen and the black screen, the contrast being defined as bright state brightness/black brightness;
Residual Image Test:

Lighting the LCD screen in the checkerboard screen for 2 h, and then switching to the 128/255 gray scale screen; determining: After switching to the 128/255 gray scale screen, the checkerboard screen residual does not appear on the LCD screen; the residual image level being defined as A, qualified; when maintaining the 128/255 gray scale screen for 10 s, the checkerboard screen residual disappearing from the LCD screen, the residual image level being defined as B, unqualified; when maintaining the 128/255 gray scale screen for 60 s, the checkerboard screen residual disappearing from the LCD screen, the residual image level being defined as C, which is seriously unqualified.

The performance test results are shown in Table 1 below.

TABLE 1

| | Black state brightness (cd/cm$^2$) | Contrast | Disappearing time for Residual image (S) | Residual image level |
|---|---|---|---|---|
| Example 1 | 0.28 | 1800 | 0 | A |
| Example 2 | 0.30 | 1680 | 0 | A |
| Example 3 | 0.32 | 1575 | 9 | B |
| Comparative Example 1 | 0.36 | 1400 | 45 | C |

As can be seen from Table 1, the contrast and the residual image levels of Examples 1 and 2 were greatly improved with respect to Comparison Example 1. Although Example 3 did not meet the residual image specifications as compared to Comparison Example 1, it still made improvement. Therefore, it is presumed that the addition of a liquid crystal group to the lower component of the liquid crystal alignment film can improve the contrast of the liquid crystal display and the residual image level.

Example 4

A liquid crystal aligning agent, characterizing in comprising the following components, (i) a polyamic acid having a photoreactive group and having no liquid crystal group having the structure wherein the average value of $n_1$ was 13, and the addition amount was 1 part by weight;

(ii) a polyamide acid having a liquid crystal group without a photoreactive group having the structure:

wherein the average value of $n_2$ was 5, and the addition amount was 1 part by weight;

(iii) a polyamide acid having both a liquid crystal group and a photoreactive group having the structure:

wherein the average value of $n_4$ was 8.5, and the addition amount was 3 parts by weight;

(iv) a polyamide acid having neither a photoreactive group nor a liquid crystal group having the structure wherein the average value of $n_5$ was 12, and the addition amount was 1 part by weight;

(v) the solvent being a mixed solvent of γ-BL 50%, NMP 20% and BC 30%, and being added in an amount of 94 parts by weight;

A liquid crystal alignment film prepared from the liquid crystal aligning agent in Example 1, by the following steps:

(a) applying a liquid crystal aligning agent in Example 1 on a substrate to form a coating film having a certain viscosity and a better diffusion;

(b) pre-baking at 110° C. for 90 s the substrate on which the coating film is formed;

(c) baking the above-mentioned coating substrate at 230° C. for 30 min to form a liquid crystal alignment film having a thickness of 100±10 nm;

(d) irradiating the film obtained in step (c) with linearly polarized light of 254 to 313 nm, and the dose being 800 mJ, to carry out the reaction so as to form an alignment;

(e) post-baking the substrate processed in step (c) at 230° C. for 30 min to sublimate the breakdown products produced from the decomposition type alignment film.

The performance of the liquid crystal panel containing the liquid crystal alignment film was tested in accordance with the performance testing method. The test results showed that the brightness of the black state was 0.22 cd/cm²; the contrast was 2000; the disappearance time of the residual image was 0 s, and the residual image level was A.

In one embodiment, the present disclosure further provides a liquid crystal display device coated with the liquid crystal alignment film formed from the liquid crystal aligning agent as described above;

or comprising the liquid crystal alignment film as described above;

alternatively, the liquid crystal display device includes the liquid crystal alignment film prepared by the method described above.

Figure 3A:
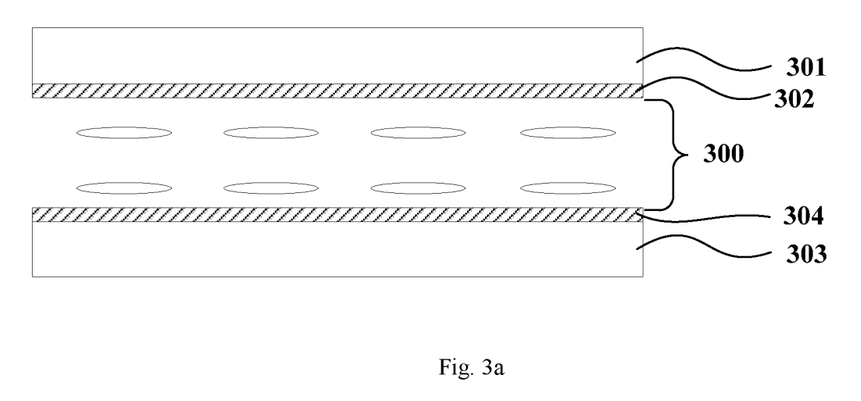
FIG. 3a shows the internal topical structure diagram of the liquid crystal display device present by the present disclosure.
Figure 3B:
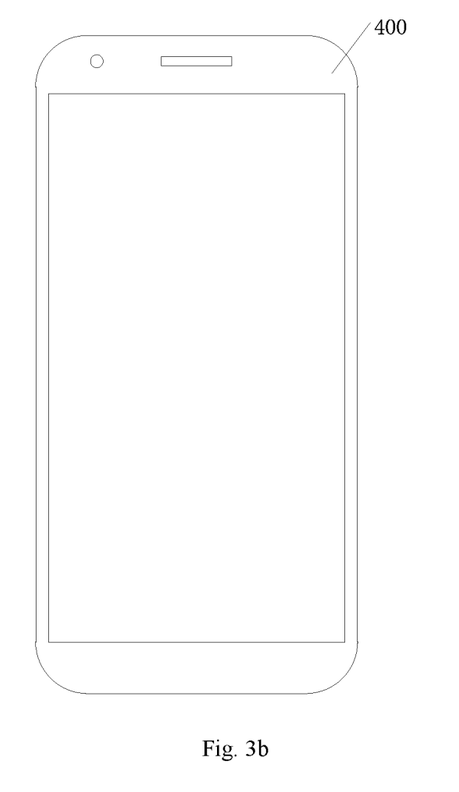
FIG. 3b shows the overall structure diagram of the liquid crystal display device present by the present disclosure.

FIG. 3a is the schematic view of the partial structure of a liquid crystal display device according to the present disclosure, wherein 301 represents a first substrate; 303 represents a second substrate; 300 is a liquid crystal layer; and the sides facing the liquid crystal layers 300 from the first substrate 301 and the second substrate 303 are coated with the liquid crystal alignment films 302 and 304 respectively. FIG. 3b is the schematic view showing a liquid crystal display device 400 having the liquid crystal alignment film according to the present disclosure. In the present embodiment, the liquid crystal display device 400 is a mobile phone. In other embodiments, the liquid crystal display device 400 may also be other types of electronic display products such as computers, televisions, watches, and vehicle display devices. The present disclosure makes no definitions to this.

The present disclosure describes the detailed processing device and process of the present disclosure, but the present disclosure is not limited to the detailed processing device and process of the present disclosure. Those skilled in the art shall know that any improvements to the present disclosure, equivalent replacement of the raw materials of the present disclosure, addition of auxiliary ingredients, selection of specific ways and the like all fall within the protection scope and disclosure scope of the present disclosure.

What is claimed is:

1. A liquid crystal aligning agent, characterizing in comprising the following components, (i) a polyimide structure unit having a photoreactive group of the following structure:

wherein $n_1$ is an integer from 5 to 20;

(ii) a polyimide structure unit having a liquid crystal group without a photoreactive group of the following structure:

or wherein $n_2$ and $n_3$ each independently is an integer from 5 to 20;

(iii) a polyimide structure unit having both liquid crystal group and photoreactive group of the following structure:

wherein $n_4$ is an integer from 5 to 20; and (iv) a polyimide structure unit having no photoreactive group or liquid crystal group of the following structure:

wherein $n_5$ is an integer from 5 to 20.

2. A method for producing a liquid crystal alignment film, characterized in comprising the following steps,
   (a) applying a liquid crystal aligning agent according to claim 1 on a substrate to form a coating film;
   (b) pre-baking a substrate on which the coating film is formed; and
   (c) performing light alignment to the film obtained in step (b), followed by post-baking to form a liquid crystal alignment film.

3. A liquid crystal display device, characterized in that the liquid crystal display device comprises a liquid crystal alignment film prepared according to the method claimed in claim 2.

* * * * *